(12) United States Patent
Allgaier

(10) Patent No.: US 7,204,364 B2
(45) Date of Patent: Apr. 17, 2007

(54) LIFTING DEVICE

(75) Inventor: Bernhard Allgaier, Niedereschach (DE)

(73) Assignee: Stein Automation GmbH (DE)

(*) Notice: Subject to any disclaimer, the term of this patent is extended or adjusted under 35 U.S.C. 154(b) by 513 days.

(21) Appl. No.: 10/073,472

(22) Filed: Feb. 11, 2002

(65) Prior Publication Data

US 2002/0150455 A1    Oct. 17, 2002

(30) Foreign Application Priority Data

Feb. 10, 2001  (DE) ................................ 101 06 193

(51) Int. Cl.
  *B66F 9/06*  (2006.01)
  *B65G 29/00*  (2006.01)
(52) U.S. Cl. .................... 198/465.1; 414/592
(58) Field of Classification Search ............ 198/465.1, 198/468.6, 468.8, 463.3, 597, 575; 414/592, 414/257, 749.3; 187/250; 74/25, 27; 254/93 L, 254/90, 97, 134
See application file for complete search history.

(56) References Cited

U.S. PATENT DOCUMENTS

| 955,866 | A | * | 4/1910 | Graham ......................... 74/27 |
| 1,755,914 | A | * | 4/1930 | Colucci .......................... 74/27 |
| 2,883,032 | A | * | 4/1959 | Leaman et al. .......... 198/468.8 |
| 2,899,043 | A | * | 8/1959 | Young ..................... 198/464.1 |
| RE25,673 | E | | 11/1964 | Burt |
| 3,187,883 | A | * | 6/1965 | Umbricht ................. 198/774.1 |
| 3,737,019 | A | * | 6/1973 | Coleman et al. ......... 198/464.2 |
| 4,669,607 | A | * | 6/1987 | Mason ..................... 198/774.1 |
| 4,750,604 | A | * | 6/1988 | Cook ....................... 198/468.6 |
| RE32,804 | E | * | 12/1988 | Mason ..................... 198/774.1 |
| 4,848,732 | A | * | 7/1989 | Rossato ....................... 254/90 |
| 5,906,266 | A | * | 5/1999 | Bungter et al. .......... 198/774.1 |
| 5,959,868 | A | * | 9/1999 | Oppliger et al. ............ 700/226 |
| 6,003,841 | A | * | 12/1999 | Aisenbrey et al. ........ 254/10 R |
| 6,145,648 | A | * | 11/2000 | Teichman et al. ........ 198/468.6 |
| 6,155,402 | A | * | 12/2000 | Murphy ................... 198/346.2 |

FOREIGN PATENT DOCUMENTS

DE       23 32 808 A1      6/1973

* cited by examiner

*Primary Examiner*—Eileen D. Lillis
*Assistant Examiner*—Gregory W Adams
(74) *Attorney, Agent, or Firm*—Akerman Senterfitt; Peter Chiabotti

(57) ABSTRACT

Lift device for lifting or, as the case may be, lowering of a support device (2, 3B, 5) of a transport track segment of a transport device for work pieces or the like, which are deposited upon plates, pallets or framework like work piece carriers (58) and upon which the work piece carrier (58) is seated translationally displaceably, with a force producing device (35, 72, 73) for producing a force for lifting or as the case may be lowering the support device (2, 3B, 5) and with a force transmission device for transmitting the force from the force producing device to the support device, the force transmission device includes at least one lever (25a, 25b), which on one side (29a, 29b) is coupled to be essentially horizontally displaceably guided with the force producing device (35, 72, 73) and on the other side (30a, 30b) is coupled with the support device (2, 3B, 5) and is guided for essentially vertical displacement.

18 Claims, 8 Drawing Sheets

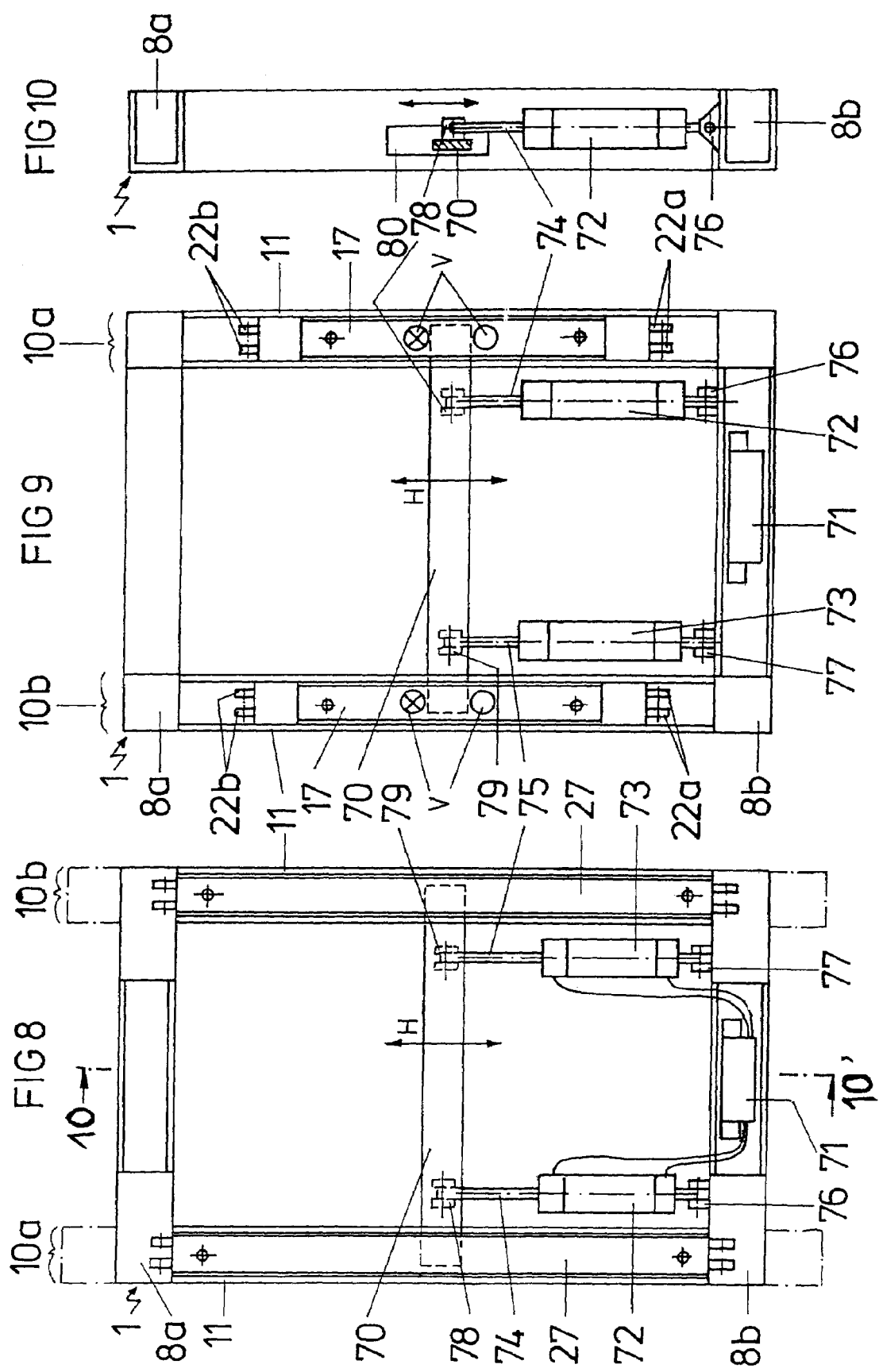

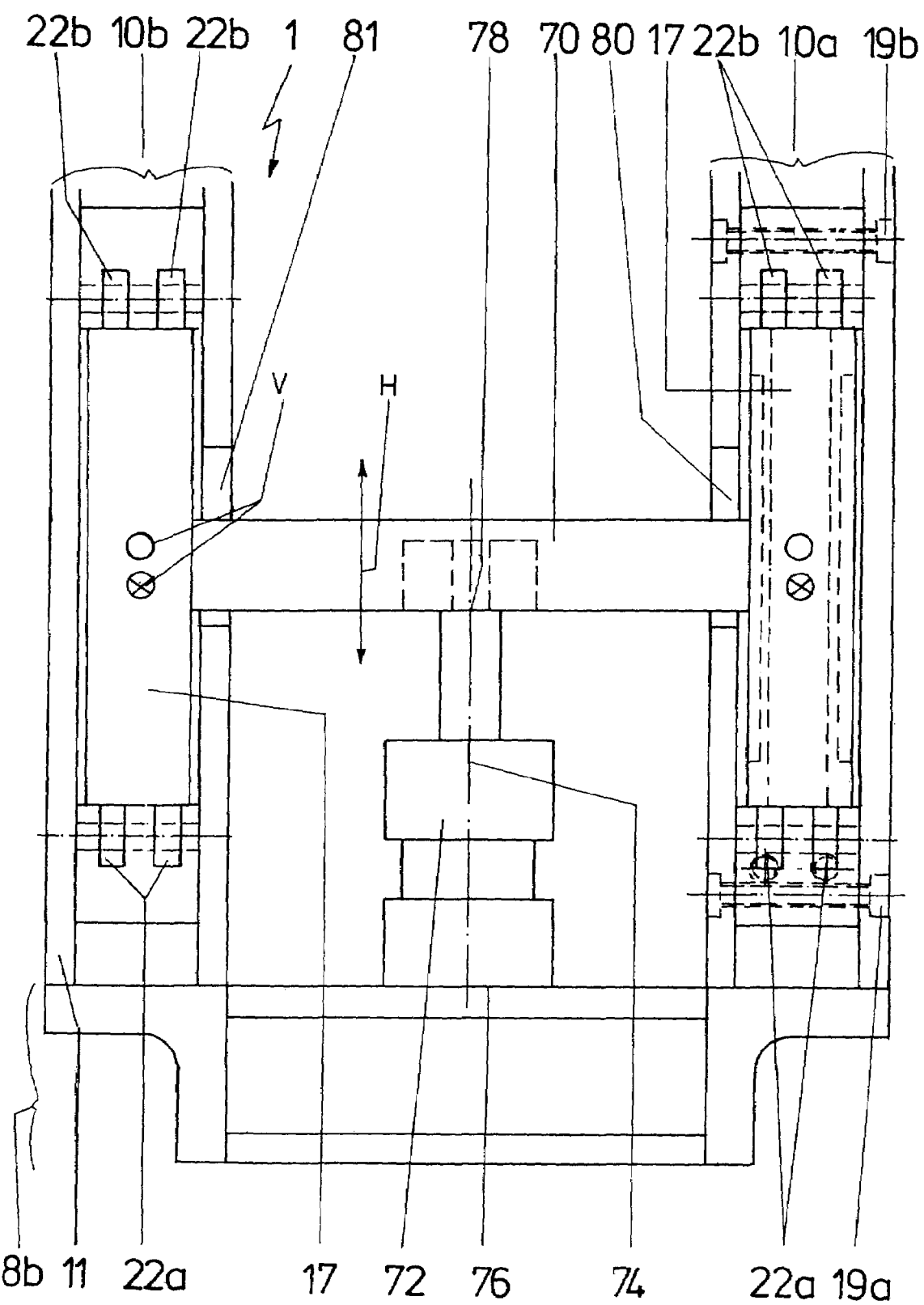

LIFTING DEVICE

BACKGROUND OF THE INVENTION

1. Field of the Invention

The invention concerns a lift device for lifting or, as the case may be, lowering a support device of a transport track segment upon which work piece carriers are provided so as to be translationally displaceable.

2. Description of the Related Art

With known flexible transport and assembly systems, a number of transport tracks or assembly tracks are connected with each other along a parallel plan, using transverse conveyors provided at right angles thereto.

According to the state of the art it is known to use so-called push-overs to push the work piece carrier from a transport track onto a transverse conveyor extending at a right angle thereto. A pusher of this type is comprised of a hydraulic or pneumatic device provided on the side of the track, of which horizontally extending rams push the work piece or, as the case may be, the carrier from the transport track onto the transverse conveyor. The problem is the displacement of the work piece or, as the case may be, the carrier, from the transverse carrier onto the transport track, that is in the reverse direction. It is a further disadvantage, that the guidance of the work piece or, as the case may be, the work piece carrier, upon the respective transport tracks or transverse carrier devices is only limitedly possible, since this would otherwise impede the pushing-over.

A further type of (reversible) translation device is known for example from DE 30 12 355 A1, comprised of transport tracks provided transverse or parallel to each other. In this device for translation of work piece carriers, work pieces, or the like, there is provided in the free space between the bands of a double belt conveyor band device a translation device with at least one translation belt extending perpendicularly to the double belt conveyor belt. This translation device has been found advantageous for employment in crossing locations of conveyor belt devices running perpendicular to each other, and makes possible a problem-free transference of the work piece carrier from one transport band to another. A problem therewith is that the transport bands or, as the case may be, transport tracks, must be positioned immediately adjacent to each other.

From DE 36 01 699 A1 a conveyor device is known, in which the transverse conveyors simultaneously assume the function of (reversible) translation, wherein a transference from the one track as well also from the other longitudinal transport track is made possible thereby. For this purpose the transverse conveyor, which crosses the longitudinal transport track, can be raised and lowered with the aid of a lifting device. These lifting devices and similar lifting systems preferably have pneumatic or hydraulic assemblies as the lifting device, which have a vertically oriented cylinder and a piston guided therein displaceable in the vertical direction for production of the lift movement, of which the piston rod is connected rigidly or via a linkage with the support device which translationally displaceably supports work piece carrier. With this type of vertically moveably guided piston or, as the case may be, piston rod, high actuation forces are necessary in order to lift the support device inclusive of the work piece carrier.

SUMMARY OF THE INVENTION

The invention is thus concerned with the task, of providing a lift device for lifting or, as the case may be, lowering of a support device of a transport track segment, upon which the work piece carriers are placed translationally displaceable, which is so designed, that only small actuation forces are necessary.

This task is solved in accordance with the invention by a lifting device for lifting or, as the case may be, lowering a support device of a transport track segment of a transport device for work pieces or the like, upon which plate-, pallet- or frame-shaped work piece carriers are laid, and upon which the work piece carrier is introduced translationally slideable, with a force transmission device including at least one lever which on one side is coupled to be essentially horizontally displaceably guided with the force producing device and on the other side is coupled with the support device and is guided for essentially vertical displacement.

The essential concept of the invention is comprised therein, that a force transmission device is provided, which includes at least one lever, which on the one side is guided at least horizontally displaceable and is coupled with the force transmission device and which on the other side is guided displaceably in the essentially vertical direction and coupled with the support device. This lever which in the lowered condition of the support device is inclined against the horizontal, and is then displaced on the other side horizontally for lifting the support device, whereby the other side is lifted, until it finally in the lift condition of the support device is oriented essentially in the vertical direction. In this position the entire load of the support device and the work piece carrier provided upon this support device inclusive of the work piece situated thereupon rests upon the lever itself and upon the horizontal guide associated with the once side of the lever. In this position no actuation force is required from the force transmission device in order to maintain the support device in the raised condition. Also, in the lowered position the forces applied in the horizontal direction by the force transmission device are lower than with a lift device according to the state of the art.

In a first embodiment of the invention it is envisioned, that the force transmission device includes two levers, which in parallel arrangement respectively on one end are mounted rotatably on at least one horizontally slideably guided slide bar and on the other side are mounted on at least one parallel to the slide bar arranged vertically slideably guided lift bar. This illustrated embodiment has the advantage, in comparison to a force transmission device based upon a single lever, that not only a point-to-point supporting or, as the case may be, lifting of the support device is possible, but rather that a one dimensional lifting along the lift bar can occur.

One design of this embodiment envisions, that two slide bars or gibs are provided parallel in such a manner, that these enclose or include the two levers. In this manner a two-sided mounting of the lever on the respective slide bars is made possible, so that their stability can be significantly increased.

In similar manner the stability can be increased when two lift bars are provided in parallel arrangement encompassing the two levers.

In accordance with the invention a further embodiment is envisioned, wherein the slider bars are provided with rollers for the horizontal guidance upon the appropriate guide bars. Therein two alternatives are possible; on the one hand, that the rollers are mounted rotatably upon the slide bars, and on the other hand, that the rollers are mounted rotatably upon the guide bars. Both alternatives serve to ensure the moveability of the slide bar in the horizontal direction.

A further variation of the invention is comprised therein, that guide rolls are also provided to the lift bars for vertical guidance at appropriate guide elements. In accordance with the presently described principle, the guide rollers can be provided mounted rotatably upon the lift bars (or an element rigidly connected thereto) or on the respective guide elements themselves. Both variants ensure a low friction vertical moveability of the lift bar and the therewith associated support device.

In accordance with the invention it is further envisioned, that sliding blocks are provided, which secure the force transmission device preferably in its entirety against a sideways displacement. This means, that these glide blocks are provided in such a manner, that essentially a linear movement of the slide bars in the horizontal direction is made possible, as well as a vertical movement of the lift bars. A movement in a direction other than these two movement directions, the planes defined by the vertical movement direction and the horizontal movement direction, should be prevented by these slide blocks.

According to the invention it is further envisioned, that the force-producing device includes at least one pneumatic device or one hydraulic device. These pneumatic or, as the case may be, hydraulic devices are provided therefore, for producing the horizontal displacement movement of the slide bars. The cylinder as well as the therein guided piston and therewith their piston rod are thereby preferably arranged in horizontal direction, and in particular in the longitudinal direction of the slider bars. Introduction of parasitic forces are avoided in this mode and manner.

In similar manner it is also possible to accomplish a displacement movement with the aid of a linear motor arranged in the just described manner. Whichever variant is to be employed depends upon the respective intended use, in particular also from the presence or as the case may be absence of associated control possibilities.

A particularly advantageous embodiment of the invention envisions that the force transmission device includes at least one (rotation) motor drive, which is coupled with a conversion device for conversion of the rotation movement of the motor drive into a horizontal linear movement. This type of motorized drive is still economical to obtain in comparison to the above described force transmission devices, and associated devices for conversion or as the case may be translation for a rotation movement into a linear movement are well known in the state of the art in a variety of alternative embodiments.

A particular advantageous embodiment is comprised therein, that an eccentric disk, a cam disk or the like is provided, which can be driven by the motorized drive and which cooperates with the one side of the lever. A cooperation between the eccentric disk and the one side of the lever can be realized in particularly simple manner thereby, that the eccentric disk (cam disk or the like) carries a pin (cam pin or the like) arranged eccentric to the drive axis of the motorized drive, which engages in a linkage mounting provided on one side of the cam, and a pin provided on one side of the slide bar engages in a linkage mount provided on the other side of the cam. A system of this type is comparable with the transmission of force from piston (internal combustion) motor to the wheel of, for example, an automobile, wherein however in the present case the force transmission occurs in the opposite direction.

In accordance with the invention it is envisioned that the motorized drive is provided with a draw spring, preferably however a pressure spring, of which the spring force supports the actuation of the (electric) motor drive, at least during lifting of the support device. The direction of bias of the pressure spring (or for example the draw spring) is thereby preferably arranged just so, that for the running of the motor essentially only a half of the force is required, which would be required without the presence of a spring of this type.

A further embodiment of the invention envisions, that a connecting device is provided on the other side of the slide bar, which is rigidly connected with a spring tension device. A pressure spring is seated upon this spring tension device, which for its part on the other side is seated upon a spring abutment rigidly connected with the guide bar. An arrangement of this type brings about an even force transmission from both sides upon the slide bars.

In a further inventive embodiment two force transmission devices in essentially identical form are provided parallel to each other which respectively carry segments of an outer roller track or, as the case may be, an inner roller track of the support device. With an appropriate coupling it is possible with one level of this embodiment to evenly raise or lower a preferably associated support device.

BRIEF DESCRIPTION OF THE DRAWING

Three illustrative embodiments of the invention are shown in the drawings and will be described in greater detail in the following. There is shown:

FIG. 8 shows a bottom view of the lift action of a second illustrative embodiment of an inventive lift device according to FIG. 2

FIG. 9 shows top view of the lift action according to FIG. 8

FIG. 10 shows a sectional view of the lift action according to FIG. 8 along the plane 10–10'.

FIG. 11 shows a bottom view of the lift action of a third illustrative embodiment of an inventive lift device according to FIG. 2

DETAILED DESCRIPTION OF THE INVENTION

Figure 1:
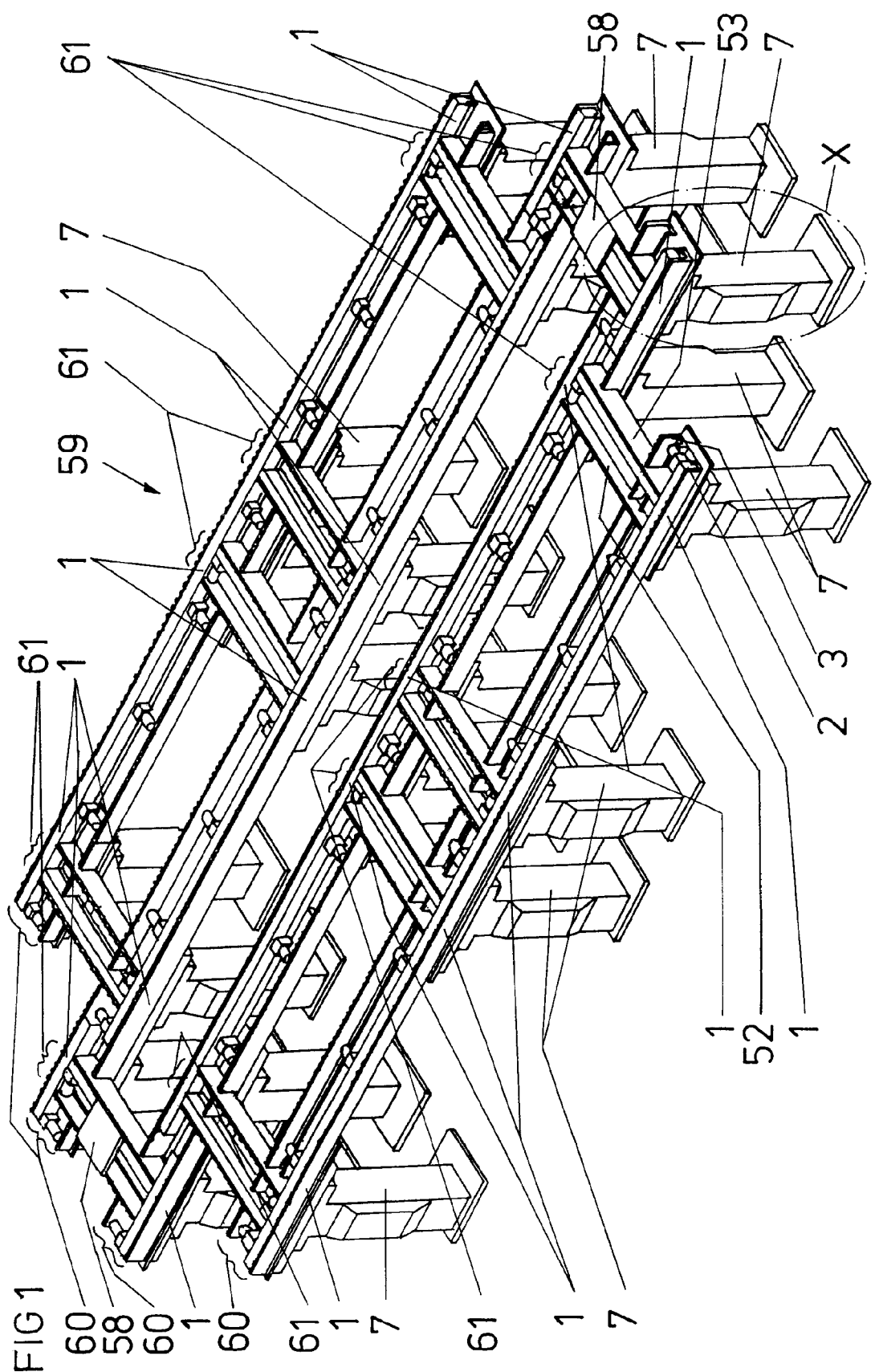
FIG. 1 shows a perspective view of a transport device with multiple longitudinal conveyor tracks, as well as multiple transverse conveyor tracks, as well as a plurality of lift devices for translation of a work piece carrier, from a longitudinal track, to transverse conveyor tracks and the reverse.

FIG. 1 shows a transport device 59 with four longitudinal conveyor tracks 60 as well as ten transverse conveyor tracks 61. The overall transport device 59 rests in this example on twenty legs 7, which in this particular embodiment are provided at the respective crossing points of the longitudinal conveyor tracks 60 and the transverse conveyor tracks 61.

The longitudinal conveyor tracks 60 and transverse conveyor tracks 61 respectively exhibit support devices, upon which one or more work piece carriers 58 can be seated translationally displaceable or slideable.

The support device is comprised in this concrete illustrative embodiment respectively of two parallel-running roller tracks 2, 3, 52, 53, which are comprised of a plurality of sequentially provided support rollers 51.

Further, both the longitudinal conveyor tracks 60 as well also the transverse conveyor tracks 61 include drive devices, which are continuously drivable by a drive motor 4, 54 and can be brought into frictional contact with the work piece carrier 58. The drive device is comprised, as will be described in greater detail in the following, of a belt 5, 55 provided between the respective outer lying and inner lying roller tracks 2, 3 as well as 52 and 53.

At the respective crossing points, which connect the longitudinal conveyor tracks 60 and transverse conveyor tracks 61 with each other, there are provided in this example respectively one lift device 1. This lift device 1 serves for the respective raising or as the case may be lowering of a transport track segment of the transport device. In the example the respectively longitudinal conveyor track segments are exclusively lowered.

Figure 2:
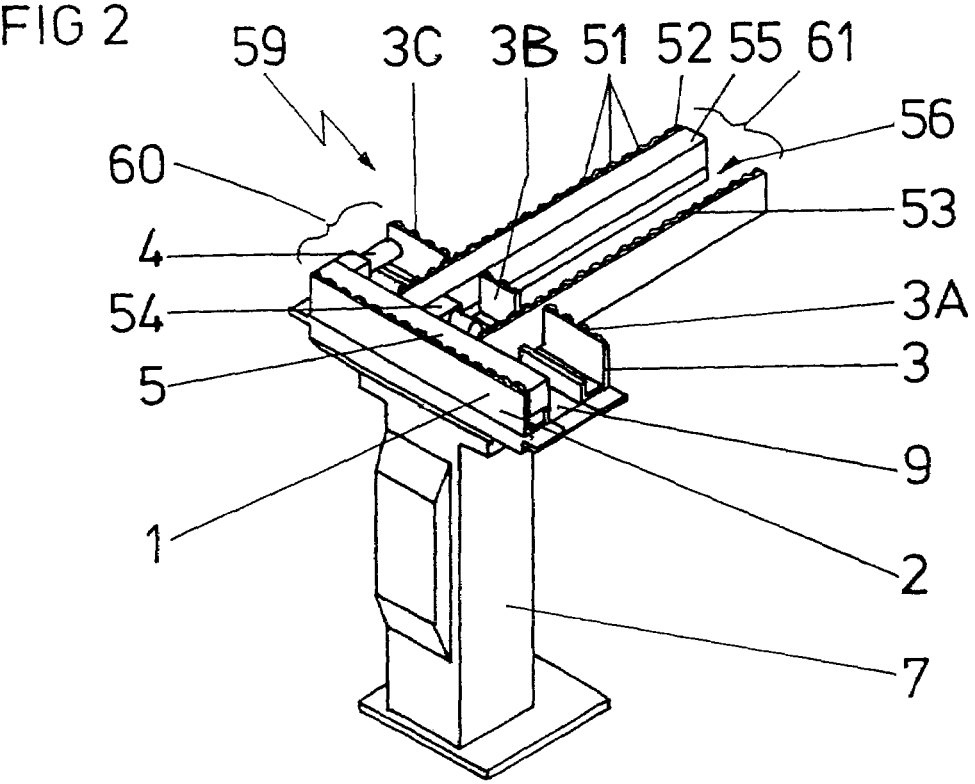
FIG. 2 shows a perspective view of a segment from the transport device according to FIG. 1 with inventive lift unit and transverse segment.

FIG. 2 shows the segment from the preceding described transport device shown in FIG. 1 and circled with a circular border and indicated with X. This segment represents the above described lift device 1 and a section of the transverse conveyor segment 61.

As can be seen from FIG. 2, the actual lift device 1 rests upon the support leg 7. As can further be seen from the figure, the roller tracks 52 and 53 of the transverse conveyor track 61 cross the inner lying track 3 of the longitudinal conveyor track 60. Thereby they bridge over the free space 9 between inner and outer roller track 2, 3 of the longitudinal conveyor track 60. The inner roller track 3 is thereby interrupted, so that the free space 56 between the roller tracks 52 and 53 of the transverse conveyor track 61 is bridged over by the middle roller track segment 3B of the inner roller track 3. The outer roller track segments of the roller track 3 which connect from the outside with the roller tracks 52 and 53 are referred with reference numbers 3A and 3C for purposes of explanation.

For the translational transport of a work piece carrier 58 guided translationally slideable upon the respective roller tracks 2, 3, 52, 53 drive devices are provided in the example for the respective outer roller tracks 2 and 52 of the longitudinal conveyor tracks 60 and transverse conveyor tracks 61. These drive devices are comprised respectively of a drive motor 4 or, as the case may be, 54 and a belt 5 or, as the case may be, 55 drivable thereby and guided parallel to the respective roller tracks 2, 52.

On the basis of FIGS. 3 through 7 there will be described in detail in the following a first illustrative embodiment of an inventive lift device 1. As can be seen from FIG. 3, the support device of the transport track segment to be raised or as the case may be to be lowered of the transport device 59 for work pieces or the like, which work pieces are placed upon plates, pallets or frame like work piece carriers 58, is comprised essentially of two parallel running roller systems, an outer roller track 2 comprised of rollers 51 and an inner roller track 3 likewise comprised of rollers 51. On the outer roller track 2 there is engaged an inner lying driven belt 5 engaged in parallel arrangement, which runs over a direction changing roller or the like, which are mounted in profile tracks having perpendicular cross section. As drive means in the present example a drive motor is employed.

The rollers 51 are mounted rotatably close to each other. The here not shown work piece carriers 58 lie upon the belt 5 as well as upon the rollers 51 of the parallel and in same elevation provided roller tracks 2 and 3 and are transported with a speed set by the advancement rate of the belt 5.

The total assembly of the support device, comprised of the two roller tracks 2 and 3 (as well as inner roller track comprised in the present described manner of the respective roller track segments 3A, 3B and 3C) and the belt 5 driven with the aide of the drive motor 4 rests upon U-shaped angular profiles 47 provided in the same elevation and parallel to each other, which function as carrier 2a, 3a, 3b, 3c of the respective roller track segments 2, 3A, 3B, 3C. The carrier of the outer roller track is referenced in the following with the reference number 2a, the carrier of the outer roller track segment 3A is referenced with the reference number 3a, the carrier of the central roller track segment 3B is referenced with the reference number 3b and the carrier of the outer roller track segment 3C is referenced with the reference number 3c.

In the present embodiment of the invention essentially the outer roller tracks 2 with the drive unit comprised of drive motor 4 and belt 5 as well as the central roller track segments 3B and the respective associated carriers 2a and 3b are raiseable (as well again lowerable) relative to the fixed outer roller track segments 3A and 3C. The lowerability or as the case may be raiseability (vertical movement/stroke movement) is indicated in the example by the double arrow referenced with reference symbol V. The coupling between the raiseable roller track segments 2 and 3B is realized by the two parallel oriented beams which also function as spacer 6.

The overall lift device 1 rests essentially upon the two legs 7 which carry a frame comprised of two parallel and in horizontal direction oriented transverse carriers 8a and 8b as well as two parallel longitudinal carriers 10a and 10b which are however oriented perpendicular to the previously mentioned transverse carriers 8a and 8b.

This frame, comprised of transverse carriers 8a and 8b as well as the longitudinal carriers 10a and 10b, serves on the one hand directly as rigid carrier for the roller track segments 3a and 3c as well as rigid carrier 52a and 53a of the two roller tracks 52 and 53 of the transverse conveyor track 61. On the other hand this frame comprised of transverse carriers 8a and 8b as well as longitudinal carriers 10a and 10b serves as carrier, against which carriers 2a and 3b of the outer roller track 2 which are moveable in the vertical direction, and the center roller track segment 3B are supported.

Figure 3:
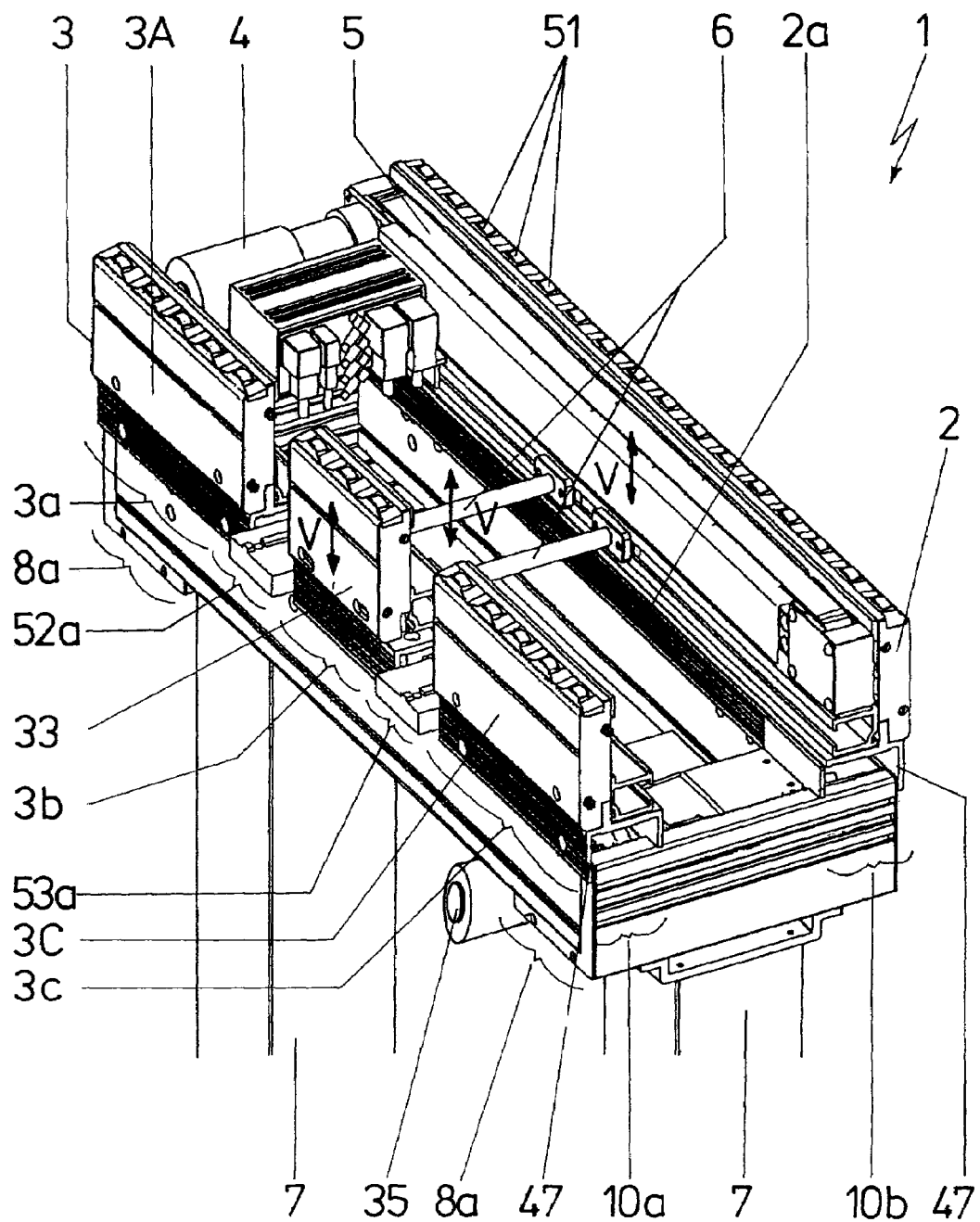
FIG. 3 shows a perspective view of a first illustrative embodiment of an inventive lift device according to FIG. 2.
Figure 4:
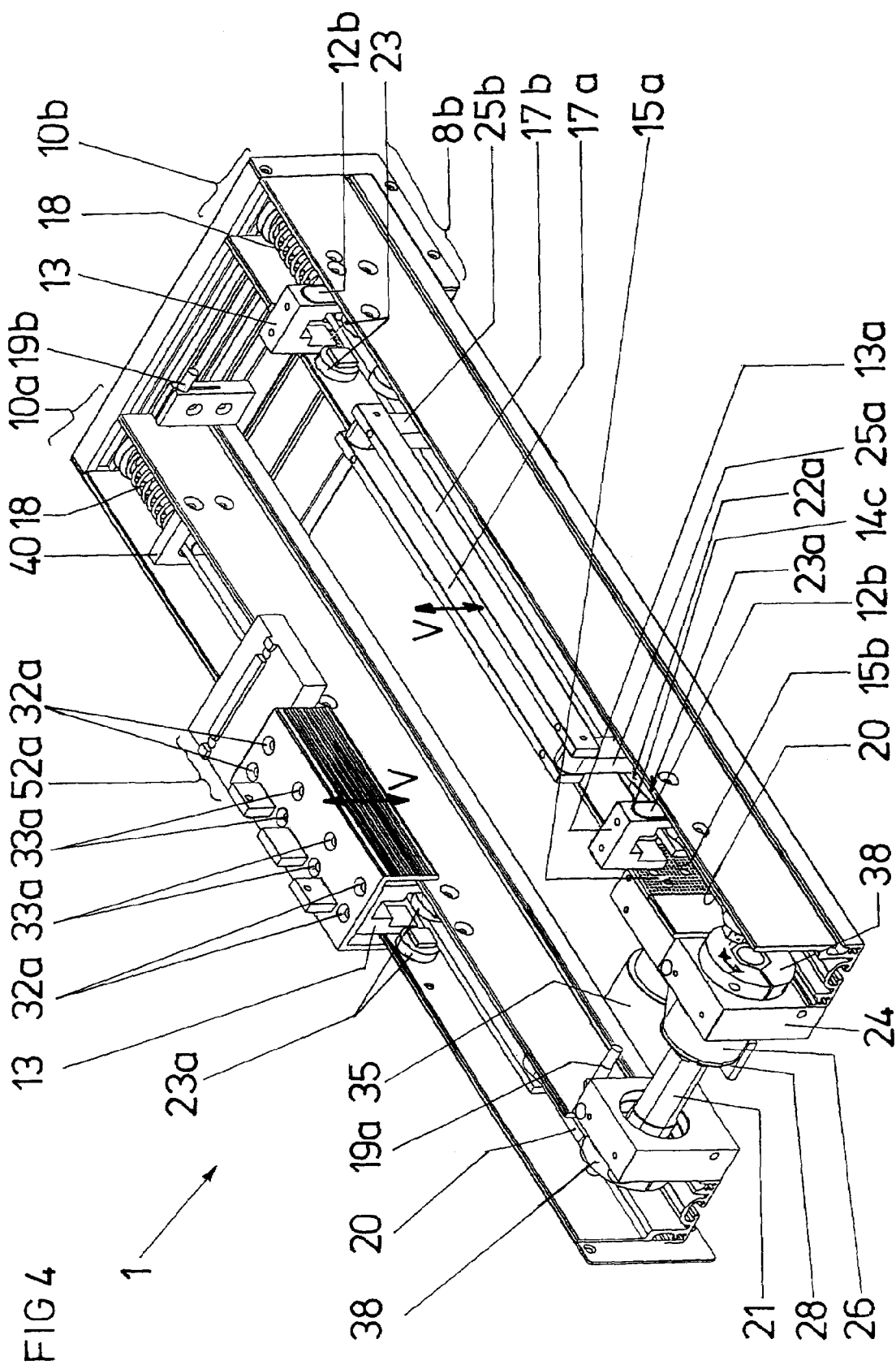
FIG. 4 shows a perspective view of the lift action of the inventive lift device according to FIG. 3.

In the following on the basis of FIG. 4 through 7 the lift action of the inventive lift device 1 according to FIG. 3 is described. The core of the actual force transmission device of the lift device 1 are the levers 25a and 25b oriented vertically in the raised position of the support device. Both levers 25a and 25b respectively exhibit linkages 29a, 29b, 30a and 30b on their ends. The lower linkages 29a and 29b are linked with two slider bars 16a and 16b oriented in the horizontal direction on both sides of the lever 25a and 25b. On the other end of the lever 25a and 25b are linked likewise two horizontally oriented lift bars 17a and 17b linked via the linkage 30a and 30b in the above described manner.

The two lower slider bars 16a and 16b are guided longitudinally to be displaceable in the horizontal direction via rollers 22a and 22b on guide bars 27a and 27b connected rigidly with the longitudinal carrier 10a or as the case may be 10b. This longitudinal slide device is referenced in the drawing with a double arrow with the reference character H.

The lift bars 17a and 17b exhibit threaded bores 33 on their upper side, via which the lift bars 17a and 17b (via appropriate bores 33a in the carrier 3b or as the case may be 2a of the center roller track segment 3B or as the case may be the outer roller track 2 engaging screws) can be screwed to carriers 2a or as the case may be 3b.

These carriers 3b of the center roller track segment 3b as well as 2a of the outer roller track 2 exhibit further boreholes 32a, via which the screwing together with two guide elements 13a and 13b provided respectively in spaced relation to the front surface of the lift bars 17a and 17b can be accomplished. These guide elements 13a and 13b exhibit for this purpose guide boreholes 32 corresponding to the boreholes 23a, in which suitable screws can be engaged.

Figure 7:
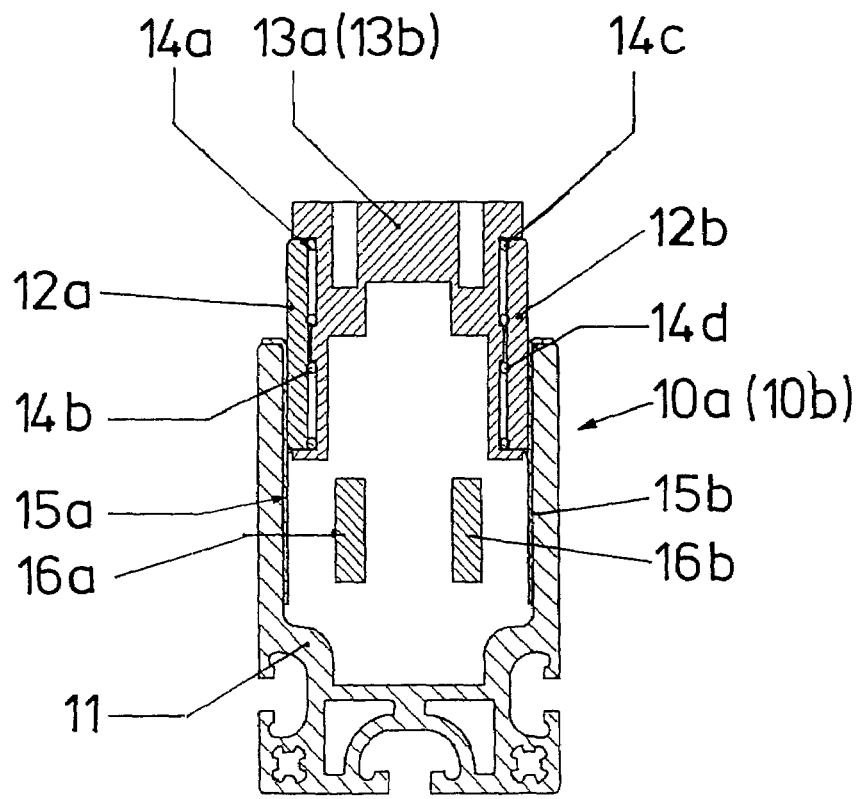
FIG. 7 shows the lift action of the inventive lift device according to FIG. 3 showing a—side view along the plane 7–7' according to FIG. 6.

These guide elements 13a and 13b are guided displaceably in the vertical direction on the one hand via guide rollers 22a and 23b mounted rigidly on the longitudinal carrier 10a (or 10b) as well as via slide blocks 15a and 15b. For reduction of the frictional resistance there are provided slide pieces 12a or as the case may be 12b on the respective sides of the guide elements 13a and 13b facing the slide blocks 15a and 15b, which via balancing springs 14a, 14b, 14c and 14d press against the sides of the guide element 13a and 13b pressing sideways in the horizontal direction against the slide blocks 15a and 15b provided on the frame profile 11 of a respective longitudinal carrier 10a, 10b, (FIG. 7).

The horizontal slideable guidance of the one side of the respective lever 25a and 25b with the aid of the slide bars 16a and 16b as well as the vertical slideability V of the other side of the lever 25a and 25b with the aid of the lift bar 17a and 17b makes it possible to convert a horizontal displacement movement into a vertical lift movement. If in the concrete case a force transmission device is provided for example in the horizontal direction against the face of the slide bars 16a and 16b, then thereby the lift bars 17a and 17b are lifted (or, as the case may be, in the opposite case, they are lowered). The rigid connection of the lift bars 25a and 25b with the carriers 2a, 3b of the corresponding roller tracks 2, 3B with the roller tracks 2, 3B to be raised or, as the case may be, to be lowered, brings about a raising or as the case may be lowering thereof (vertical movement V) in the above described manner.

In the following three different embodiments for production of the vertical displacement movement are explained. In particular there is shown in FIGS. 3 through 6 the inventive arrangement of a force producing device based upon an electric-motor drive, FIGS. 8 through 10 show a appropriate force transmission device based upon two pneumatic units, and FIG. 11 shows a force transmission unit based upon a single pneumatic or hydraulic device.

Reference is made to FIGS. 3 through 6. These force transmission devices are based upon a drive motor 35, and a device for converting the rotation movement produced by the motor 35 into a horizontal linear movement H of the slide bars 16a and 16b.

Figure 5:
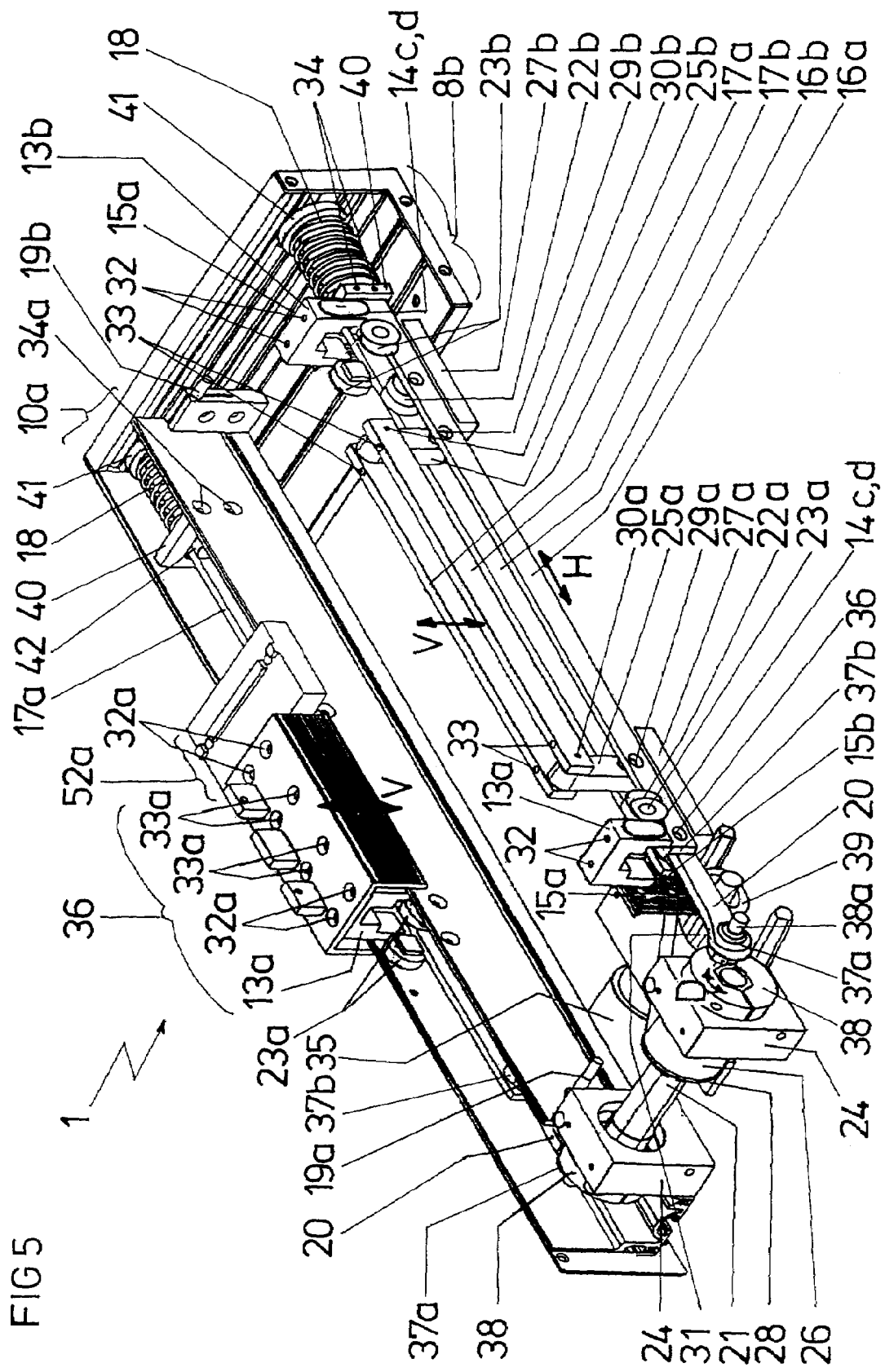
FIG. 5 shows a perspective detail view of the lift action of the inventive lift device according to FIG. 3.
Figure 6:
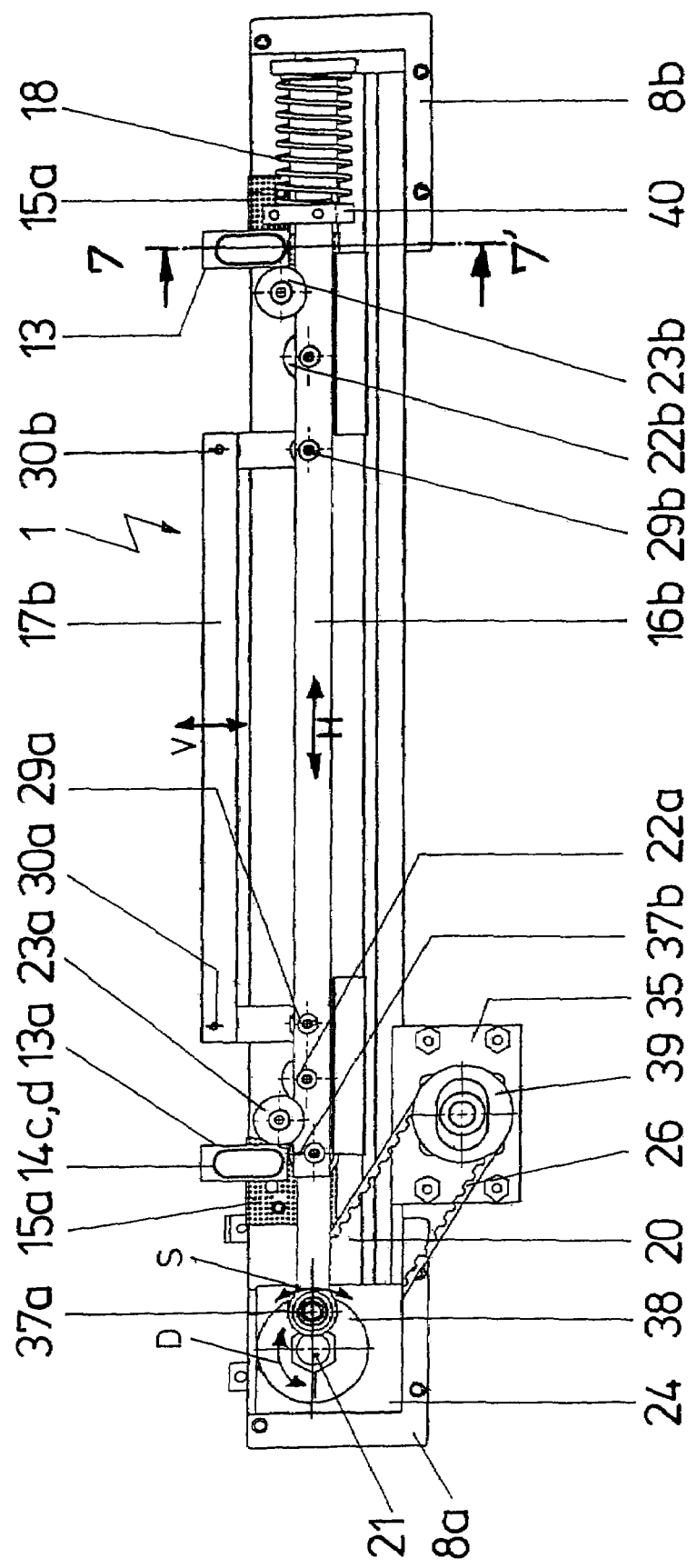
FIG. 6 shows a side view of the lift action of the inventive lift device according to FIG. 3.

As can be seen from the illustration according to FIG. 5, a drive wheel 31 is seated upon the drive shaft of the motor 35. Via this drive wheel 31 a toothed belt 26 is guided, which again for its part is guided over a drive wheel 28. This drive wheel 28 is seated upon a drive shaft 21, which has the form of a multi-sided profile. This drive shaft 21 having multiple sides is rotatably mounted on two mounting blocks or shoes rigidly connected with the two longitudinal carrier 10a and 10b.

On the end of this drive shaft 21 there is seated a crank disk 38, which carries an eccentric pin 38a in eccentric arrangement.

This eccentric pin 38a is rotatably guided in a linkage mount 37a of a crank 20. The crank 20 carries on the other end a further linkage mount 37b, in which a pin 36, which is rotatably mounted in the end face of the slide bars 16a and 16b, is likewise rotatably mounted.

A rotation movement of the motor axle of the motor 35 is thus transmitted to the crank disk 38 via the drive wheel 31, the toothed belt 26, the drive wheel 28 and the drive shaft 21. The rotatability of the crank disk 38 is indicated in the figure by the double arrow referenced with reference character D.

The conversion of a force acting in horizontal direction into a vertical lift movement and the therewith associated reduction of the force requirement has already been described above.

For recognition of the position of the support device the invention envisions that inductive proximity switches 19a or as the case may be 19b are provided at the direction changing points on the ends of the slide bars.

For reducing the start up torque of the motor 35 the invention envisions the following described spring device. Thus there is provided on the other sides of the slide bars 16a and 16b a connecting device 42, which is rigidly connected with a cylinder like spring tensioning device 41, upon which a compression spring 18 is seated on the one side and which again on the other side is seated upon a rigidly with the guide bar 27b connected spring abutment 40.

The entire force transmission is preferably, as can be seen from the example of FIG. 5, in doubled parallel arrangement and in essentially identical shape. Both force transmission devices are, as can be seen from this figure, components of the two longitudinal carriers 10a and 10b.

In the following one further inventive embodiment of a force transmission device is disclosed. From FIGS. 8 through 10 a device of this type can be seen. From the figures one can see a frame like carrier 11 as described above. In particular, the two longitudinal carriers 10a and 10b as well as the two transverse carriers 8a and 8b spaced apart therefrom are shown. Above this one can see from the figures that the guide bar 27 extends over the entire length of the respective longitudinal carrier 10a or as the case may be 10b. In this guide bar 27 the slide bars 16a and 16b exhibiting the rollers 22a and 22b are guided displaceably along the horizontal direction. The lift bars 17 are coupled therewith in the above described mode and manner, which are likewise guided in the above described mode and manner (however here not illustrated) slideably in the vertical direction V.

In the present illustrative embodiment the slide bars 16a and 16b guided in the frame profile 11 of the longitudinal carrier 10a and 10b are connected with each other via an actuation rod 70.

In this actuation rod 70 there is provided, mirror symmetrically to the mirror plane B–B', securing means 78 and 79, with which rams 74 and 75 of two pneumatic devices 72 and 73 are rotatably associated.

The pneumatic cylinder 72 and 73 of the pneumatic devices are again associated by means of not in greater detail described securing devices 76 and 77 to a transverse carrier 8b.

The two pneumatic cylinders 72 and 73 are connected by a balancing or equalization valve, which ensures an even pressure action of both cylinders of the pneumatic devices 72 or as the case may be 73.

With the aid of these two pneumatic devices 72 and 73 the actuation rod 70 can be displaced in the horizontal direction. The horizontal displaceability of the actuating rod and therewith (the not shown) slide bars is indicated as in the previous illustrated embodiment with the aid of a double arrow, which is provided with the reference character H.

FIG. 11 shows a lift device 1 based upon a single pneumatic device 72. Just as in the illustrative embodiment of a lift device described above in detail, so too does the present lift device 1 base itself upon a framework like carrier 11, which is comprised of two transverse carriers 8a and 8b as well as two longitudinal carriers 10a and 10b. Again in the above described mode and manner, slider bars 16a and 16b are guided horizontally displaceable in the longitudinal carriers 10a and 10b. The slide bars 16a and 16b guided in the respective longitudinal carriers 10a and 10b are connected with each other via an actuating rod 70. The actuating rod 70, just as in the previous example, passes through a right angle shaped recess 80 in the inner lying shank of the U-shaped longitudinal carrier 10a and 10b.

In contrast to the above described embodiment, the displacement of the actuating rod 70 occurs with the aid of a single pneumatic device 74 provided in the center of the actuating rod 70, oriented in the horizontal direction. The securing of the pneumatic cylinder 72 as well as the force transmitting rams 74 occurs analogously to the previously described embodiments with the aid of suitable securing means 78 and 76.

REFERENCE NUMBER LIST

1 Lift device
2 Outer roller track
2a Carrier for the outer roller track
3 Inner roller track
3a Carrier for the outer roller track segment
3b Carrier for the center roller track segment
3c Carrier for the outer roller track segment
3A Outer roller track segment
3B Center roller track segment
3C Outer roller track segment
4 Drive motor
5 Belt
6 Spacer
7 Leg
8a Transverse carrier
8b Transverse carrier
9 Free space
10 Longitudinal carrier
10a Longitudinal carrier
10b Longitudinal carrier
11 Frame profile
12a Slide piece
12b Slide piece
13a Guide element
13b Guide element
14a Equalizing ring
14b Equalizing ring
14c Equalizing ring
14d Equalizing ring
15a Slide block
15b Slide block
16a Slide bar
16b Slide bar
17 Lift bar
17a Lift bar
17b Lift bar
18 Compression spring
19a Inductive proximity switch
19b Inductive proximity switch
20 Crank
21 Drive shaft
22a Rollers for horizontal guidance
22b Rollers for horizontal guidance
23a Guide rollers for vertical guidance
23b Guide rollers for vertical guidance
24 Mounting block or shoe
25a Lever
25b Lever
26 Toothed belt
27 Guide bar
27a Guide bar
27b Guide bar
28 Drive wheel
29a Linkage
29b Linkage
30a Linkage
30b Linkage
31 Drive wheel
32 Threaded borehole
32a Borehole
33 Threaded borehole
33a Borehole
34 Threaded borehole
34a Borehole
35 Motor
36 Pin
37a Linkage mount
37b Linkage mount
38 Crank disk/eccentric disk
38a Eccentric pin
39 Drive wheel
40 Spring abutment
41 Spring tension device
42 Connecting device for connecting spring tension device with slide bar
47 U-shaped angular profile
51 Roll
52 Outer roller track
52a Carrier for outer roller track
53 Inner roller track
53a Carrier for the inner roller track
54 Drive motor
55 Belt
56 Free space
58 Work piece carrier
59 Transport device
60 Longitudinal conveyor segment
61 Transverse carrier segment
70 Actuation rod
71 Valve
72 Pneumatic device
73 Pneumatic device
74 Ram
75 Ram
76 Securing device
77 Securing device
78 Securing device
79 Securing device
80 Recess
81 Recess
V Vertical movement/stroke movement
H Horizontal movement/displacement movement
D Rotational movement
S Tolerance

What is claimed is:

1. A lift device for lifting and lowering a support device (2, 3B, 5) of a transport track segment of a transport device for work pieces, the lift device comprising:

a work piece carrier (58), wherein the work pieces are deposited on the work piece carrier;

a force producing device (35, 72, 73), wherein the force producing device produces a force for lifting or lowering the support device (2, 3B, 5);

a force transmission device, wherein the force transmission device transmits the force from the force producing device to the support device; and wherein the force transmission device includes at least on lever (25*a*, 25*b*) having a first end (29*a*, 29*b*) coupled to the force producing device (35, 72, 73), the first end (29*a*, 29*b*) guided for horizontal displacement, and having a second end (30*a*, 30*b*) coupled to the support device (2, 3B, 5), the second end (30*a*, 30*b*) guided for vertical displacement, wherein the first end (29*a*, 29*b*) is linked to at least one slide bar (16*a*, 16*b*) oriented in the horizontal direction, wherein the second end (30*a*, 30*b*) is linked to at least one lift bar (17*a*, 17*b*) parallel to the at least one slide bar (16*a*, 16*b*), and wherein the at least one lever includes two levers, and two slide bars (16*a*, 16*b*) are provided oriented parallel and bracketing the two levers (25*a*, 25*b*).

2. A lift device according to claim 1, wherein a connecting device (42) is provided on the side of the slide bar(s) (16*a*, 16*b*) opposite of the force transmission device, which is connected with a spring tensioning device (41) having a pressure spring (18) seated upon a spring abutment (40), which is rigidly connected with a guide bar (27*b*).

3. A lift device according to claim 1, wherein the at least one lever (25*a*, 25*b*) includes two levers, and two lift bars (17*a*, 17*b*) are provided in parallel orientation and bracketing the two levers (25*a*, 25*b*).

4. A lift device according to claim 1, wherein the at least one slide bar includes two slide bars, and the slide bars (16*a*, 16*b*) are associated with rollers (22*a*, 22*b*) for horizontal guidance on guide bars (27, 27*a*, 27*b*).

5. A lift device according to claim 4, wherein the rollers (22*a*, 22*b*) are mounted rotatably in the slide bars (16*a*, 16*b*).

6. A lift device according to claim 4, wherein the rollers are mounted rotatably in the guide bars.

7. A lift device according to claim 1, wherein guide rollers (22*a*, 22*b*) are provided for vertical guidance of guide elements (13*a*, 13*b*).

8. A lift device according to claim 7, wherein the guide elements (13*a*, 13*b*) are connected with the lift bars (17*a*, 17*b*).

9. A lift device according to claim 1, wherein slide blocks (15*a*, 15*b*) are provided for guiding the force transmission device (16*a*, 16*b*, 17*a*, 17*b*, 25*a*, 25*b*) in a sideways direction.

10. A lift device according to claim 1, wherein the force transmission device includes at least one motor drive (35) and a conversion device for converting the rotational movement of the motor drive (35) into a horizontal linear movement.

11. A lift device according to claim 10, wherein an eccentric disk (38) is provided, which is drivable by a motor drive (35) and which is in operable association with one end (29*a*, 29*b*) of the lever (25*a*, 25*b*).

12. A lift device according to claim 11, wherein the eccentric disk (38) carries an eccentric pin (38*a*) to the drive axis of the motor drive (35), which engages in a linkage mount (37*a*) provided on the one side of a crank (20), wherein a pin (36) provided on the one side of the slide bar(s) (16*a*, 16*b*) engages in a linkage mount (37*b*) provided on the other side of the crank (20).

13. A lift device according to claim 11, wherein the motor drive (35) is provided with a pressure or pull spring (18), of which the spring effect supports the start-up of the motor drive (35) at least during lifting of the support device (2, 3B, 5).

14. A lift device according to claim 1, wherein two force transmission devices (16*a*, 16*b*, 17*a*, 17*b*, 25*a*, 25*b*, 18, 20) are provided in parallel arrangement to each other, which respectively carry segments of an outer roller track (2) or an inner roller track (3B) of the support device.

15. A lift device for lifting and lowering a support device (2, 3B, 5) of a transport track segment of a transport device for work pieces, the lift device comprising:

a work piece carrier (58), wherein the work pieces are deposited on the work piece carrier;

a force producing device (35, 72, 73), wherein the force producing device produces a force for lifting or lowering the support device (2, 3B, 5);

a force transmission device, wherein the force transmission device transmits the force from the force producing device to the support device; and wherein the force transmission device includes at least one lever (25*a*, 25*b*) having a first end (29*a*, 29*b*) coupled to the force producing device (35, 72, 73), the first end (29*a*, 29*b*) guided for horizontal displacement, and having a second end (30*a*, 30*b*) coupled to the support device (2, 3B, 5), the second end (30*a*, 30*b*) guided for vertical displacement, wherein the first end (29*a*, 29*b*) is linked to at least one slide bar (16*a*, 16*b*) oriented in the horizontal direction, wherein the second end (30*a*, 30*b*) is linked to at least one lift bar (17*a*, 17*b*) parallel to the at least one slide bar (16*a*, 16*b*), and wherein the at least one lever (25*a*, 25*b*) includes two levers, and two lift bars (17*a*, 17*b*) are provided in parallel orientation and bracketing the two levers (25*a*, 25*b*).

16. A lift device for lifting and lowering a support device (2, 3B, 5) of a transport track segment of a transport device for work pieces, the lift device comprising:

a work piece carrier (58), wherein the work pieces are deposited on the work piece carrier;

a force producing device (35, 72, 73), wherein the force producing device produces a force for lifting or lowering the support device (2, 3B, 5);

a force transmission device, wherein the force transmission device transmits the force from the force producing device to the support device; and wherein the force transmission device includes at least one lever (25*a*, 25*b*) having a first end (29*a*, 29*b*) coupled to the force producing device (35, 72, 73), the first end (29*a*, 29*b*) guided for horizontal displacement, and having a second end (30*a*, 30*b*) coupled to the support device (2, 3B, 5), the second end (30*a*, 30*b*) guided for vertical displacement, wherein the first end (29*a*, 29*b*) is linked to at least one slide bar (16*a*, 16*b*) oriented in the horizontal direction, wherein the second end (30*a*, 30*b*) is linked to at least one lift bar (17*a*, 17*b*) parallel to the at least one slide bar (16*a*, 16*b*), and wherein the at least one slide bar includes two slide bars, and the slide bars (16*a*, 16*b*) are associated with rollers (22*a*, 22*b*) for horizontal guidance on guide bars (27, 27*a*, 27*b*).

17. A lift device for lifting and lowering a support device (2, 3B, 5) of a transport track segment of a transport device for work pieces, the lift device comprising:

a work piece carrier (58), wherein the work pieces are deposited on the work piece carrier;

a force producing device (35, 72, 73), wherein the force producing device produces a force for lifting or lowering the support device (2, 3B, 5);

a force transmission device, wherein the force transmission device transmits the force from the force producing device to the support device; and wherein the force transmission device includes at least one lever (25a, 25b) having a first end (29a, 29b) coupled to the force producing device (35, 72, 73), the first end (29a, 29b) guided for horizontal displacement, and having a second end (30a, 30b) coupled to the support device (2, 3B, 5), the second end (30a, 30b) guided for vertical displacement, wherein the first end (29a, 29b) is linked to at least one slide bar (16a, 16b) oriented in the horizontal direction, wherein the second end (30a, 30b) is linked to at least one lift bar (17a, 17b) parallel to the at least one slide bar (16a, 16b), and wherein guide rollers (22a, 22b) are provided for vertical guidance of guide elements (13a, 13b).

18. A lift device for lifting and lowering a support device (2, 3B, 5) of a transport track segment of a transport device for work pieces, the lift device comprising:

a work piece carrier (58), wherein the work pieces are deposited on the work piece carrier;

a force producing device (35, 72, 73), wherein the force producing device produces a force for lifting or lowering the support device (2, 3B, 5);

a force transmission device, wherein the force transmission device transmits the force from the force producing device to the support device; and wherein the force transmission device includes at least one lever (25a, 25b) having a first end (29a, 29b) coupled to the force producing device (35, 72, 73), the first end (29a, 29b) guided for horizontal displacement, and having a second end (30a, 30b) coupled to the support device (2, 3B, 5), the second end (30a, 30b) guided for vertical displacement, wherein the force transmission device includes at least one motor drive (35) and a conversion device for converting the rotational movement of the motor drive (35) into a horizontal linear movement, and wherein an eccentric disk (38) is provided, which is drivable by a motor drive (35) and which is in operable association with one end (29a, 29b) of the lever (25a, 25b).

* * * * *